United States Patent [19]

McDade et al.

[11] Patent Number: 4,754,385
[45] Date of Patent: Jun. 28, 1988

[54] TWO TRANSISTOR FLYBACK SWITCHING CONVERTER WITH CURRENT SENSING FOR DISCONTINUOUS OPERATION

[75] Inventors: Don McDade; Mathew Mahmoudi, both of Garland; B. R. Tompkins, Plano, all of Tex.

[73] Assignee: Varo, Inc., Garland, Tex.

[21] Appl. No.: 8,866

[22] Filed: Jan. 30, 1987

[51] Int. Cl.[4] .......................................... H02M 3/335
[52] U.S. Cl. .......................................... 363/16; 363/56
[58] Field of Search ...................... 363/16, 17, 56, 98, 363/132

[56] References Cited

U.S. PATENT DOCUMENTS

| 4,370,701 | 1/1983 | Western | 363/20 |
| 4,585,986 | 4/1986 | Dyer | 363/132 X |

FOREIGN PATENT DOCUMENTS

| 0029522 | 3/1978 | Japan | 363/16 |
| 0096176 | 5/1985 | Japan | 363/56 |

OTHER PUBLICATIONS

Krumrein, "DC Converter", IBM Technical Disclosure Bulletin, vol. 17, No. 7, Dec. 1974, p. 1978.
Patel et al., "150 Watt Flyback Regulator", Unitrode Switching Regulated Power Supply Design Seminar Manual, 1986.

*Primary Examiner*—Peter S. Wong
*Attorney, Agent, or Firm*—Jerry W. Mills; Roger N. Chauza

[57] ABSTRACT

Disclosed is a dual transistor flyback converter having a pair of synchronously driven switching transistors (20, 36) for switching voltage to a primary (12) of a flyback transformer (10). When driven into a cutoff state, transistor (36) isolates switching transistor (20) from the supply voltage (V1), thereby preventing a transformer reflected voltage from being superimposed on the supply voltage and imposing such voltage across the transistor (20). Clamp diodes (40, 42) maintain the switching transient voltage across the flyback transformer primary (12) between prescribed limits. Capacitor (48) allows the switching transient to pass and be clamped by the diodes (40, 42), but prevents the reflected secondary voltage from being clamped when the input voltage is low. A current sensing circuit (50) in series with the flyback transformer secondary (14) senses current flow during the power conversion cycle, and provides a digital indication to a PWM control circuit (66) to facilitate reliable discontinuous operation of the flyback converter.

17 Claims, 1 Drawing Sheet

TWO TRANSISTOR FLYBACK SWITCHING CONVERTER WITH CURRENT SENSING FOR DISCONTINUOUS OPERATION

TECHNICAL FIELD OF THE INVENTION

The present invention relates in general to power supplies, and more particularly relates to switching converters of the flyback type.

BACKGROUND OF THE INVENTION

Switching regulators and converters convert DC power from one voltage level to DC power of another voltage level. Switching converters typically utilize a transformer through which an input voltage source is switched to produce an output voltage across the transformer secondary. Depending upon the turns ratio of the transformer, the output DC voltage can be less than or greater than the DC power supplied to the input of the converter. The transformer secondary voltage is rectified and filtered to produce the output DC voltage.

In one family of switching converters, a switching device is driven by a pulse circuit for switching the input DC power through the transformer at a predetermined frequency. The output voltage of the converter can be regulated by a feedback circuit which senses the output voltage of the converter to change the duty cycle of the pulse circuit. In this manner, when more power is required at the converter output, the input switching transistor is driven by a higher duty cycle, thereby delivering more power to the load. Such converters using this principle are known as the pulse-width modulated (PWM) type.

Switching converters of the well-known flyback type include a transistor in series with the transformer primary as a switch which is periodically driven with a pulse to allow current to flow through the transformer primary. Pulse width modulation techniques can also be utilized with flyback regulators to vary the duty cycle or width of the pulse. However, with flyback regulators or converters, the transformer primary functions as an inductor when the transistor switch is turned on. A diode in the transformer secondary prevents current flow therethrough when the primary inductance is being charged with energy. When the transistor switch is turned off, the transformer voltages reverse and the stored energy is discharged through the transformer secondary into the output capacitor and load, thereby replenishing the energy delivered by the capacitor to the load. During this discharge time when the switching transistor is off and the transformer voltages are reversed, the transistor must withstand the reflected secondary voltage in addition to the input supply voltage. For a 1:1 transformer turns ratio, the voltage across the switching transistor can be twice the supply voltage. After all energy has been discharged into the capacitor, the primary switching transistor is again turned on and the cycle repeats. A tertiary voltage sense winding is sometimes added to the transformer to detect when the transformer has not been fully discharged. If, as the result of a fault condition, the sense voltage has not dropped to zero by the beginning of the next cycle, the switching transistor is inhibited from turning on again until the transformer has fully discharged.

Several inherent disadvantages accompany the described flyback switching supply. First, when voltages of large magnitudes are involved, transistors are not available with a breakdown voltage capable of withstanding the reflected secondary voltage added to the supply voltage. As a result, a transistorized flyback switching supply cannot be used in this application.

Another inherent shortcoming of the described type of flyback switching supply is that the voltage sense winding of the transformer is a poor indication of when all the energy has been transferred from the transformer. The voltage from the sensing winding of the transformer is characterized by noise, oscillations and other hash. This makes it difficult to determine when the current in the transformer secondary has been reduced to zero.

From the foregoing, it can be seen that a need exists for a flyback switching supply which is improved with regard to at least two aspects. First, a need exists for a circuit arrangement which prevents voltages in excess of the supply voltage from being impressed across the switching transistor. Secondly, a need exists for a better method of sensing when the current in the transformer secondary reaches a minimum value.

SUMMARY OF THE INVENTION

In accordance with the present invention, a dual transistor flyback converter is disclosed which eliminates or substantially reduces the shortcomings associated with the corresponding prior art converters.

In accordance with the flyback converter of the invention, a pair of synchronously driven transistors are switched into a conduction state to allow current to flow through a transformer primary. When the transistors are both driven to cutoff, the energy stored in the primary is transferred to the secondary, and thus to a load connected to the transformer secondary. Importantly, the transistors are arranged so that when they are in the cutoff state, one transistor isolates the input supply voltage from the transformer so that voltage reflected back to the primary is not superimposed on the input supply voltage. In this manner, neither transistor is exposed to a voltage in excess of the input supply voltage. Switching transistors of a lower breakdown voltage can thus be utilized. Alternatively, transistors with the highest available breakdown voltage can be used in conjunction with a large amplitude input supply voltage to thereby provide a flyback converter with a higher input voltage capability than transistorized flyback converters heretofore known.

The flyback converter of the invention further includes means for clamping one terminal of the transformer primary to the positive input supply voltage. Means are also provided for clamping the other transformer primary terminal to the negative or ground terminal of the input supply voltage. With this clamp arrangement, the turnoff voltage spike due to the leakage inductance never exceeds the supply voltage, and is referenced to ground rather than added to the supply voltage. Thus, neither drive transistor experiences a voltage higher than the input supply voltage during the turnoff transient. An RC network is placed in series with one of the clamp diodes to prevent significant current flow through the diodes if the reflected secondary voltage exceeds the supply voltage, while allowing current flow therethrough during the transistor turnoff transient.

The flyback converter of the invention further includes an improved sensing circuit for determining when the energy of the transformer primary has been completely transferred to the secondary. In accordance with this feature of the invention, the sensing circuit senses current flow in the transformer secondary circuit. The current sensing circuit is operative during the cycle when energy is being transferred from the transformer secondary to the output capacitor and load, and is rendered inoperative during the time when the secondary circuit is inactive due to the charge up of the transformer primary. False inhibition of the drive transistors as a result of extraneous voltage spikes in the secondary circuit is thus obviated. The current sensing circuit comprises a current transformer placed in series with the flyback transformer secondary circuit. The current which is sensed as flowing in the secondary circuit is converted into a digital voltage for disabling the control circuitry for driving the transistor switches in the flyback converter primary circuit.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same elements throughout the views, and in which.

DETAILED DESCRIPTION OF THE INVENTION

Figure 1:
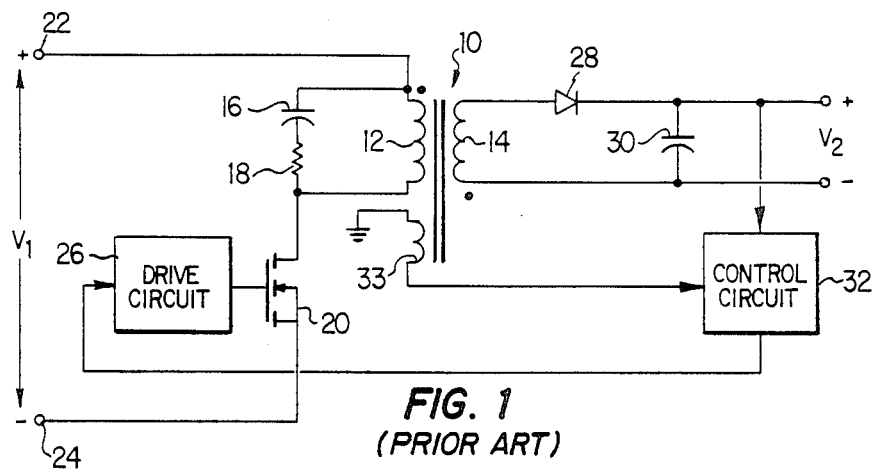
FIG. 1 is a schematic illustration of a single transistor flyback regulator well known in the art.

FIG. 1 illustrates a single transistor flyback power converter of the type well known in the art. The power converter includes a transformer 10 with a primary 12 and a secondary 14. A snubber network, comprising a capacitor 16 in series with a resistor 18 is connected across the transformer primary 12. The primary 12 is also connected in series with a switching transistor 20. An input supply voltage V1 is connected between the positive terminal 22 and negative terminal 24 of the power converter primary circuit. The switching transistor 20 is driven by a drive circuit 26.

The power converter secondary circuit comprises the transformer secondary 14 which is connected in series with a diode 28. A filter capacitor 30 is connected across the transformer secondary 14 and diode 28. The V2 output of the switching converter is taken across the capacitor 30. A pulse width modulation control circuit 32 senses the output voltage V2 of the power converter and provides an input signal to the drive circuit 26. The control circuit 32 is also responsive to the voltage across a tertiary winding 33 of the transformer 10 for providing a properly timed signal to the drive circuit 26.

In operation, when the switching transistor 20 is driven into conduction by the drive circuit 26, the input voltage V1 is applied across the primary 12 of the transformer 10. Because of the polarities of the primary 12 and secondary 14 of the transformer 10, the diode 28 is reverse biased, and no current flows in the secondary circuit. Thus, the primary 12 of the transformer 10 functions as an inductor, wherein the current therein builds up linearly until the transistor 20 is driven into cutoff by the drive circuit 26. Since the net current in an inductor cannot change instantaneously, the voltage across the transformer secondary 14 reverses, wherein diode 28 becomes forward biased. This allows the inductive current to continue to flow in the transformer secondary 14 instead of the primary 12. The transformer secondary 14 thus functions as an inductor in parallel with the filter capacitor 30. Capacitor 30 is selected to have sufficient capacitance to maintain the output voltage V2 at a constant magnitude. The energy stored in the inductance of the transformer secondary 14 discharges into the capacitor 30 as a linear current, thereby replenishing the energy stored in the capacitor 30.

The tertiary winding 33 of the transformer 10 produces a voltage until all the energy has been transferred to the capacitor 30. The tertiary winding 33 is connected to the control circuit 32 so that the drive circuit is inhibited from starting another switching cycle until all the energy has been completely transferred. During normal operation, all energy is tranferred before the start of the next cycle, in which case the sense winding 33 has no effect on the switching cycle. The control circuit 32 is also connected to the output of the power converter, and is responsive to load changes for varying the duty cycle time in which the drive transistor 20 is maintained in a conductive state. In accordance with conventional pulse width modulation control circuits 32 and drive circuit 26, the switching transistor 20 is maintained in a conductive state for longer periods of time in correspondence with larger load requirements placed on the power converter.

Figure 2:
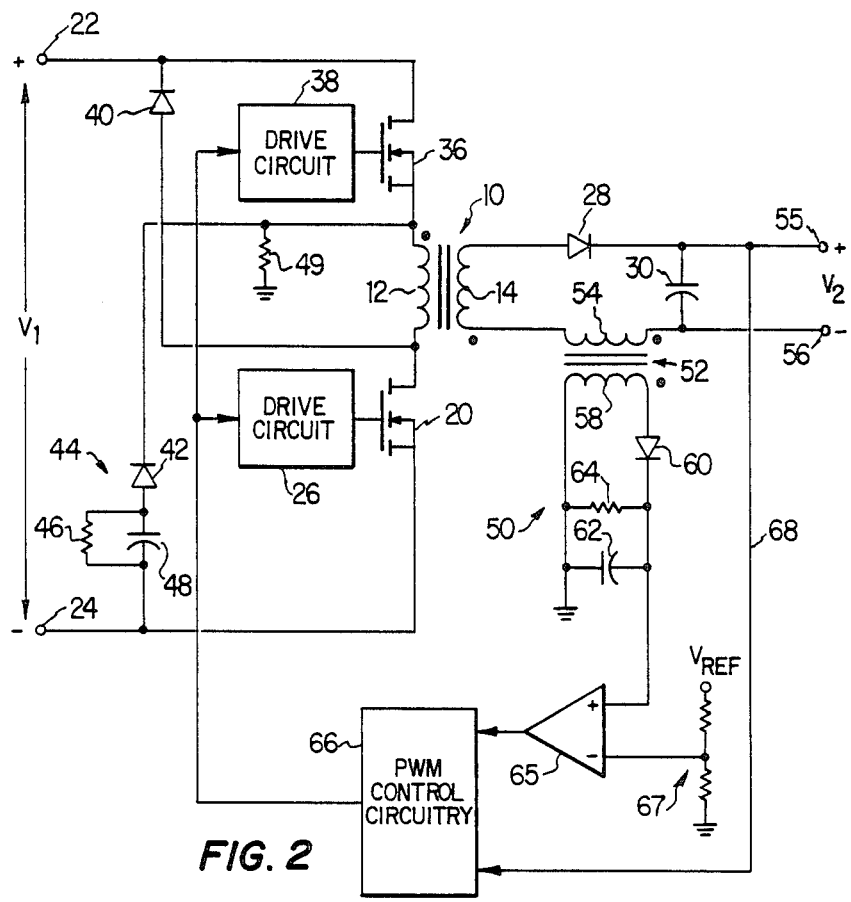
FIG. 2 is a schematic illustration of the dual transistor flyback converter constructed in accordance with the invention.

Having described the operation of a conventional single transistor flyback power converter, reference is now made to FIG. 2 where there is illustrated the dual transistor flyback converter of the invention. The components common to the circuits of FIG. 1 and FIG. 2 are identified by the same reference characters. In addition to switching transistor 20 which switches input supply current through the transformer primary 12, a second switching transistor 36 is connected between the transformer primary 12 and the input supply voltage terminal 22. Switching transistors 20 and 36 are driven in parallel and synchronously by respective drive circuits 26 and 38. Drive circuits 26 and 38 are substantially identical for simultaneously driving the corresponding transistors 20 and 36 into conduction and into cutoff. As well documented in the art, drive circuits 26 and 38 include coupling transformers (not shown). The coupling transformer associated with drive circuit 26 is referenced with respect to converter terminal 24, while the coupling transformer associated with drive circuit 38 is referenced with respect to the source terminal of switching transistor 36.

The dual transistor flyback converter of the invention further includes a clamp diode 40 having a cathode connected to the supply voltage input terminal 22, and an anode connected to the same transformer primary terminal which is connected to switching transistor 20. A second clamp diode 42 has a cathode connected to the transformer primary terminal which is also connected to switching transistor 36. The anode of diode 42 is connected through a parallel network 44 comprising a resistor 46 and a capacitor 48. The network 44 is connected between the clamp diode 42 and the negative supply voltage input terminal 24. A resistor 49 is connected to the transformer primary 12 to provide an electrostatic discharge path so that a residual voltage does not build up in the primary circuit of the converter. The resistor 49 has a large value, in the order greater than 47 kohm.

In accordance with another feature of the invention, the dual transistor flyback converter includes a load current sensing circuit 50 for sensing load current delivered by the transformer secondary 14. The current sensing circuit 50 includes a current transformer 52 having a primary winding 54 connected between the low voltage output terminal 56 of the converter and the transformer secondary 14. Transformer 52 includes a secondary 58 connected to a diode rectifier 60. The output of the current transformer secondary 58 and diode 60 is connected across a filter capacitor 62. A shunt resistor 64 is connected across the capacitor 62. A comparator 65 is connected by its noninverting input to the cathode of diode 60. The inverting input of comparator 65 is connected to a resistor divider 67 which provides a reference voltage to such input. The output of the comparator 65 is connected to a pulse width modulator (PWM) control circuit 66.

The current sensing circuit 50 is connected to the conventional PWM control circuit 66 which drives the drive circuits 26 and 38. The PWM control circuit 66 is connected by a conductor 68 to the output terminal 55 of the converter, thereby sensing the output voltage V2. More specifically, the PWM control circuit 66 is enabled by a digital signal from the current sensing circuit 50 to supply the drive circuits 26 and 38 with another signal when the current in the transformer secondary 14 is zero, or at a preselected minimum. The signal supplied to the drive circuits 26 and 38 by the PWM control circuit 66 is characterized by a pulse width which is associated with the magnitude of the voltage V2 at the converter output. When the converter output voltage V2 is lower than a predetermined magnitude, the pulse width output by the PWM control circuit 66 is made wider. In this manner, the drive circuits 26 and 38 cause the respective transistors 20 and 36 to remain in a conductive state for a corresponding longer period of time, thereby allowing more energy to be stored in the transformer primary 12. On the other hand, when the voltage V2 at the converter output rises above the predetermined magnitude, the width of the pulse output by the PWM control circuit 66 is reduced, thereby reducing the conduction time of the transistors 20 and 36. The PWM control circuit 66 thereby functions to regulate the output voltage V2 of the converter in a discontinuous mode.

When switching transistors 20 and 36 are simultaneously driven into conduction, the dual transistor flyback converter of the invention operates in a conventional manner. Namely, current flows through the transformer primary 12 between the input terminals 22 and 24. Because of the polarity of the transformer primary 12 and secondary 14, the power rectifying diode 28 is reverse biased and no current flows therethrough at this time in the power conversion cycle. During this time, the energy stored in the output filter capacitor 30 delivers power to the load (not shown) connected to the converter output terminals 55 and 56. Also, during the cycle when drive transistors 20 and 36 are conducting, clamp diodes 40 and 42 are reverse biased and thus do not affect the operation of the flyback converter.

During the power conversion cycle when the switching transistors 20 and 36 are simultaneously driven into cutoff, transistor 36 functions to isolate transistor 20 from the input source of power V1 connected to terminal 22 of the converter. During the power conversion cycle when both switching transistors 20 and 36 are cut off polarity of the voltage across the transformer secondary 14 is reversed, thereby forward biasing rectifying diode 28 and allowing the transformer energy to be delivered to the filter capacitor 30 and thus to the load.

As a consequence of the polarity reversal of the voltage on the transformer secondary 14, a corresponding voltage is reflected back across the transformer primary 12. The reflected voltage is inversely proportional to the turns ratio of transformer 10. With a 1:1 turns ratio transformer 10, the reflected voltage on the terminal of the transformer primary 12 connected to switching transistor 20 will be typically equal to the voltage V1 of the input power source. In accordance with an important feature of the invention, the reflected voltage is not superimposed on the input power source voltage V1, as transistor 36 functions to electrically isolate the reflected voltage from the input power source V1. Importantly, the electrical isolation is also effective to isolate switching transistor 20 from the input power source V1. During the switching transistor cutoff portion of the cycle, the voltage developed across switching transistor 36 is substantially equal to the input supply voltage V1, while the voltage developed across the switching transistor 20 is essentially equal to the reflected voltage. Accordingly, transistors 20 and 36 can be selected with a breakdown voltage lower than heretofore possible. Alternatively, high breakdown voltage transistors can be utilized so that yet even higher voltage input supply power sources V1 can be used.

Clamp diode 42 functions to provide a path for leakage inductance current from the power source input terminal 24 to the transformer primary 12. In those situations where the input terminal 24 is connected to ground, the junction between the transformer primary 12 and the switching transistor 36 is clamped substantially to ground. In the event a voltage transient across transistor 20 during turnoff is higher than the input power source V1, diode 40 is effective to clamp such transient to the magnitude of the input supply voltage V1 connected to terminal 22. Thus, the voltage across switching transistor 20 is limited to the input supply voltage V1.

An additional improvement is provided by the RC network 44 of resistor 46 and capacitor 48. If the ripple component of the input supply voltage V1 is large, the reflected voltage from the transformer secondary 14 to the primary 12 may exceed the input supply voltage magnitude V1 for a portion of the ripple cycle. Capacitor 48 is added to block current flow through diodes 40 and 42 during this portion of the input supply ripple cycle. Capacitor 48 is selected to exhibit a sufficiently large capacitance to allow the leakage inductance current spike to pass therethrough during the switching transistor turnoff part of the switching cycle, but is small enough to prevent additional current flow during the rest of the switching cycle. Resistor 46 allows for the discharge of capacitor 48. With the clamping arrangement shown, an unfiltered or poorly filtered power source V1 can be used with the converter of the invention without serious adverse effects, provided the output capacitor 30 has a large enough capacitance to filter the ripple. Importantly, if the input supply is a rectified sine wave with only enough filtering for the high switching frequency, the input current will also be a low distortion sine wave.

In accordance with another feature of the invention, a more reliable determination of the discontinuous mode of the flyback converter is made possible by the current sensing circuit 50. For proper operation in the discontinuous mode of the flyback converter, the current in the transformer secondary 14 should drop to zero before the switching transistors 20 and 36 are driven into another conduction cycle. The current transformer 52 is provided to sense the transformer secondary current, rather than the voltage, as an indication to determine when the switching transistors 20 and 36 can be driven into conduction. When the current in the transformer secondary 14 reaches a preselected minimum or zero value, there will be a corresponding minimum or zero current in the secondary 58 of the current sensing transformer 52. As a result, diode 60 will not be forward biased, and thus there will be minimum voltage presented to the comparator 65. The PWM control circuit 66 is then able to initiate another power conversion cycle in which the drive circuits 26 and 38 will be activated to drive the switching transistors 20 and 36 into a conductive state.

When, on the other hand, there is some minimum current flowing in the transformer secondary 14, an associated current will flow in the secondary 58 of current sensing transformer 52. Because the current sensing transformer 52 has a non-inverting polarity from the primary 54 to the secondary 58, diode 60 will conduct when rectifier diode 28 is also conducting. Current in the current sensing transformer secondary 58 is conducted through the diode 60 and a voltage is thus developed across resistor 64. The voltage across resistor 64 is then applied as a dc voltage to the comparator 65, as noted above. Capacitor 62 has a selected capacitance value to present a low impedance to noise and ripple voltages, and thus such signals are not coupled to the comparator 65. The dc voltage across capacitor 62 has an amplitude which corresponds to the current in the secondary 14 of the transformer 10. The dc voltage applied to the noninverting input of the comparator 65 is compared against the reference voltage supplied by the resistor divider 67 to the comparator inverting input. The selection of the resistor values of the divider 67 sets the threshold of the comparator 65 to produce a low output digital level when the transformer secondary 14 current has fallen below the preselected value. The digital output of the comparator 65 enables or disables the operation of the PWM control circuit 66.

As can be appreciated, by sensing the current in the transformer secondary 14, instead of voltage, a more reliable signal is presented to the PWM control circuit 66. During the off time of the secondary winding, diode 28 is reverse biased and prevents noise currents from flowing. False triggering of the switching transistors 20 and 36 is thereby eliminated or substantially reduced.

From the foregoing, disclosed is a dual transistor flyback converter which may be more readily constructed because of the reduced constraints of the drive transistor breakdown voltages. By providing one transistor for isolating the input power source from the flyback transformer during certain cyclical periods of the power conversion cycle, the other switching transistor does not experience a supply input voltage with a transformer reflected voltage superimposed thereon. The provision of a pair of clamp diodes further assures that the voltage across the flyback transformer does not exceed the magnitude of that of the input supply voltage.

Disclosed also is a sensing circuit which is responsive to current flowing in the secondary circuit of the flyback converter, rather than sensing the flyback transformer voltages which are susceptible to noise and other spurious signals. Current sensing is provided by connecting a current transformer in the flyback transformer secondary circuit. The actual electrical parameter of interest, namely current, is sensed to determine a preselected minimum, and converted to a digital signal to thereby enable the PWM control circuit to initiate another power conversion cycle.

While the principles and concepts of the invention have been set forth above, it is to be understood that such a converter is not limited by this disclosure. Therefore, while the preferred embodiment of the invention has been disclosed with reference to a specific flyback converter, it is to be understood that many changes in detail may be made as a matter of engineering choice without departing from the spirit and scope of the invention as defined by the appended claims.

What is claimed is:

1. A flyback switching converter, comprising:
   an input switching section coupled to a source of input power;
   an output section for filtering an output voltage of the converter;
   a transformer for coupling said input section to said output section;
   said input switching section comprising a switching device operative during a switching device conductive state to switch voltage from the input power source to the transformer, and means for electrically isolating said switching device from the input power source when said switching device is in a nonconductive state to thereby reduce the magnitude of a voltage impressed across said switching device and
   clamping means connected between said transformer and the source of input power for providing a transformer leakage inductance current path to the source of input power during the nonconductive state of said switching device, and for preventing the source of input power form clamping an output section voltage when a reflected transformer voltage is greater than the source of input voltage.

2. The flyback switching converter of claim 1 wherein said means for isolating comprises a transistor connected between the input power source and said switching device.

3. The flyback switching converter of claim 2 further including means for driving said switching device and said transistor into conductive and nonconductive states during the same time.

4. The flyback switching converter of claim 2 wherein the transformer includes a primary with a pair of terminals, and wherein said switching device is connected in association with one said terminal, and said transistor is connected in association with the other said terminal.

5. The flyback switching converter of claim 1 wherein said clamping means is operative during the nonconductive state of said switching device for clamping the voltage across the transformer to a predetemined value.

6. The flyback switching converter of claim 5 wherein said transformer comprises two terminals, and said clamping means comprises a diode in series with a capacitor.

7. The flyback switching converter of claim 2 further including a feedback circuit for sensing the voltage in said output section and driving said switching device and said transistor with a desired pulse width.

8. The flyback switching converter of claim 7 further including means for converting an indication of the magnitude of current in the output section into a digital signal for controlling the operation of said feedback circuit.

9. A flyback switching converter, comprising:
an input switching section coupled to a source of input power;
an output section for filtering an output voltage of the converter;
a transformer coupling said input section to said output section; and
a control circuit for driving said input switching section in a discontinuous mode of operation, said control circuit including a transformer having a primary for monitoring the current flowing in said output section and sensing when said current falls below a predetermined level, and a secondary operative for enabling said input switching section.

10. The flyback switching converter of claim 9 wherein said control circuit comprises means for converting an analog current signal to a digital voltage, and wherein one state of said digital signal indicates a current level greater that said perdetermined level and another state indicates a current level less than said predetermined level.

11. The flyback switching converter of claim 10 wherein said means for converting comprises a comparator.

12. The flyback switching converter of claim 9 wherein said transformer secondary is connected to a rectifier and filter.

13. The flyback switching converter of claim 12 further including a comparator with an input connected to said filter, and wherein said comparator provides an output digital signal having one digital state indicating when the current in said output section is below a predetermined level.

14. A flyback switching converter, comprising:
an input switching section coupled to a source of input power;
an output section for filtering an output voltage of the converter;
a transformer coupling said input section to said output section;
control means responsive to an output of said output setion for driving said switching section;
said input switching section comprising a switching device operable during a switching device conductive state to switch current form said input power source to said transformer, and means for electrically isolating said switching device from said input power source when said switching device is in a nonconductive state to thereby reduce the magnitude of voltage impressed across said switching device;
clamping means including a diode and a series capacitor connected between said transformer and the source of input power for providing a transformer leakage inductance current path to the source of input power during the nonconductive state of said switching device, and for preventing the source of input power from clamping an output section voltage when a reflected transformer voltage is greater than the source of input voltage; and
a control circuit for driving said input switching section in a discontinuous mode of operation, said control circuit including a transformer in series with said output section for monitoring the current in said output section, and sensing means for sensing when said output current falls below a predetermined level for enabling said switching section.

15. The flyback switching converter of claim 14 wherein said sensing mean comprises means for converting an analog current signal to a digital voltage, and wherein one state thereof indicates a current greater than said predetermined level, and another state thereof indicates a current less than said predetermined level.

16. The flyback switching converter of claim 15 wherein said means for converting comprises a comparator.

17. The flyback switching converter of claim 6 wherein said capacitor is operative to allow a leakage inductance current spike to pass therethrough during turnoff of said switching device, but prevent additional current to flow therethrough during a following part of a switching cycle of said switching device.

* * * * *